Aug. 10, 1948.                C. OHLSON                    2,446,605
                  COOKING VESSEL WITH AUTOMATIC
                       PRESSURE REGULATION
                       Filed Jan. 17, 1946
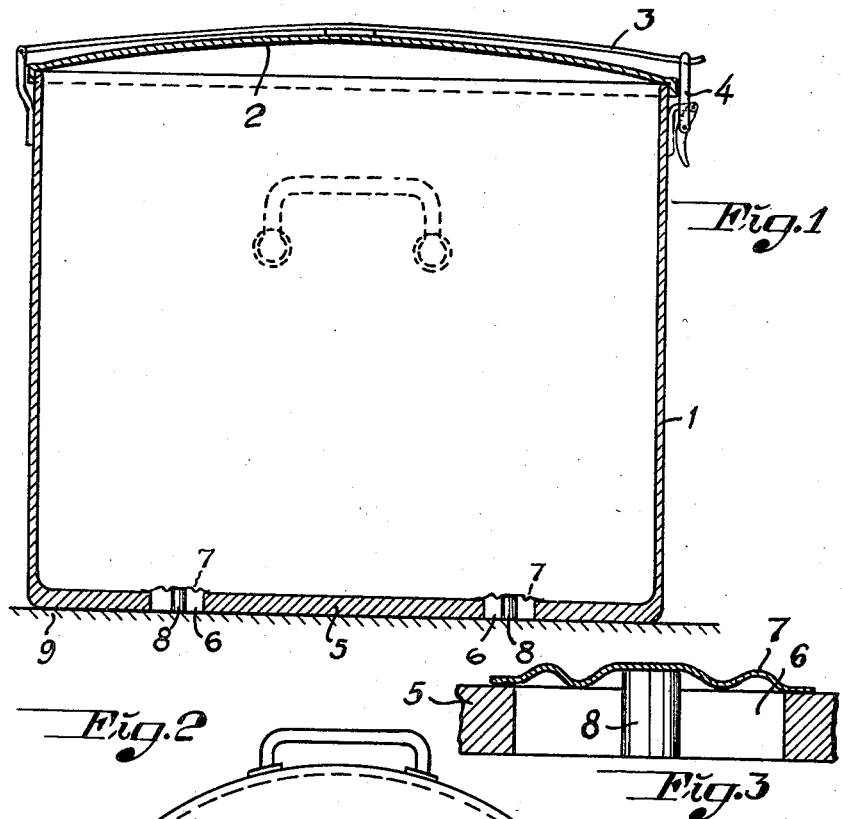
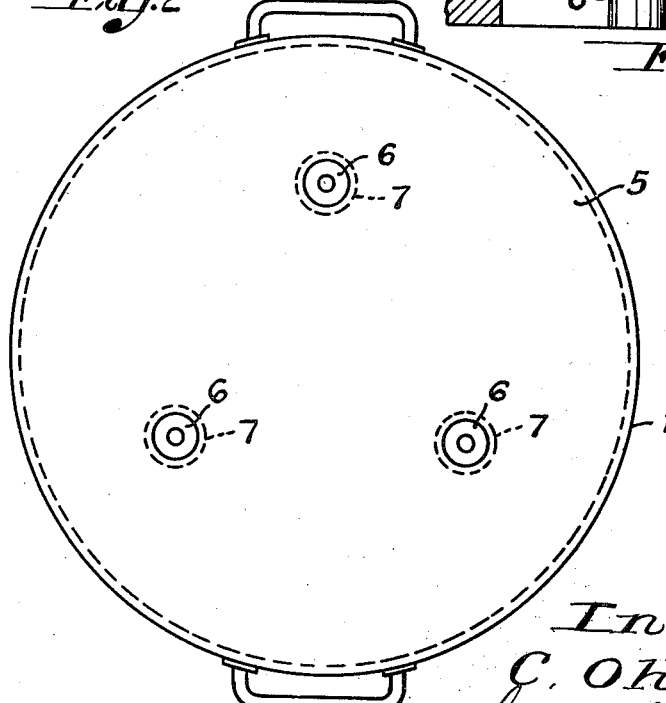
Inventor
C. Ohlson Patented Aug. 10, 1948

2,446,605

UNITED STATES PATENT OFFICE 2,446,605

COOKING VESSEL WITH AUTOMATIC PRESSURE REGULATION

Clas Ohlson, Insjon, Sweden

Application January 17, 1946, Serial No. 641,801
In Sweden February 1, 1945

1 Claim. (Cl. 126—374)

The present invention relates to cooking vessels which during boiling are hermetically closed such that the steam pressure and the temperature of the boiling liquid are increased above their normal values with the result that the time required for cooking meat or other victuals contained in the liquid is considerably reduced. In order to eliminate the risk of explosion at intensified supply of heat and consequent exaggerative steam pressure in the vessel, such vessels are usually provided with safety valves of various constructions for relieving excessive pressure. There arises, however, the inconvenience that the quantity of liquid in the vessel is reduced when steam or vapour is blown out through the safety valve.

The object of the invention is to avoid the above-named inconvenience and to eliminate the risk of explosion by means for automatically reducing the temperature in the vessel in response to an excessive increase of pressure without the necessity of blowing off steam or pressure.

I attain this object by mechanism illustrated in the accompanying drawing, in which:

Fig. 1 is a vertical section of a cooking-vessel provided with the improved safety means according to the invention; Fig. 2 is a bottom view of the vessel; and Fig. 3 is a section, to an enlarged scale, of the safety means.

Referring to the drawing, the cooking-vessel 1 is hermetically closed by means of a lid 2 which is tightly pressed against the upper edge of the vessel by means of a resilient transverse member 3 held in position by a suitable locking device 4. In the bottom 5 of the vessel, openings 6 are provided which at the inner side of the bottom are covered by diaphragms 7 tightly secured to the bottom around the openings 6. The thickness, diameter, shape and material of each of the diaphragms are such that the diaphragms at a predetermined super-atmospheric pressure in the vessel will be bent outwards. The diaphragms are connected with studs or knobs 8 extending through the openings 6. Normally, the outer ends of the studs or knobs are located in the same plane as the outer surface of the bottom 5. When, however, the diaphragms due to a certain increase of the pressure prevailing in the vessel are bent outwards, the studs or knobs 8 will project from the bottom plane with the result that the vessel will be slightly lifted from the support or boiling-plate 9 such that an air space will be present between the vessel and the support. As a result thereof, the supply of heat to the vessel, and consequently, the temperature therein will be reduced until the interior pressure, which is dependent upon the temperature, has been decreased to such an extent that the diaphragms are bent inwardly again and the studs or knobs again are flush with the outer surface of the bottom 5 which then again rests on the support 9.

The invention is obviously not limited to a certain number of diaphragms and studs.

What I claim is:

In a cooking-vessel adapted to rest on a heat supplying support, means for hermetically closing the vessel, at least one opening in the bottom of the vessel, a diaphragm covering said opening and tightly secured to the inside of said bottom, and stud means operatively associated with said diaphragm and extending into said opening, said diaphragm being adapted, in response to a predetermined increase of the pressure prevailing in said vessel during boiling, to be bent outward and thereby to move part of said stud means out of said opening, whereby to lift said vessel from said support.

CLAS OHLSON.

REFERENCES CITED

The following references are of record in the file of this patent:

UNITED STATES PATENTS

| Number    | Name   | Date          |
|-----------|--------|---------------|
| 90,835    | Frank  | June 1, 1869  |
| 1,519,766 | Demuth | Dec. 16, 1924 |
| 1,625,847 | Decker | Apr. 26, 1927 |

FOREIGN PATENTS

| Number  | Country       | Date          |
|---------|---------------|---------------|
| 6,408   | Great Britain | 1895          |
| 837,802 | France        | Nov. 18, 1938 |